United States Patent
Sokolov

(12) United States Patent Sokolov

(10) Patent No.: US 6,901,565 B2
(45) Date of Patent: *May 31, 2005

(54) RTL POWER ANALYSIS USING GATE-LEVEL CELL POWER MODELS

(75) Inventor: Serguei A. Sokolov, Andover, MA (US)

(73) Assignee: Sequence Design, Inc., Santa Clara, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 10/447,076

(22) Filed: May 27, 2003

(65) Prior Publication Data

US 2003/0208733 A1 Nov. 6, 2003

Related U.S. Application Data

(63) Continuation of application No. 09/798,016, filed on Feb. 28, 2001, now Pat. No. 6,598,209.

(51) Int. Cl.[7] ............................................. G06F 17/50
(52) U.S. Cl. .............................. 716/4; 716/1; 703/18
(58) Field of Search ........................... 716/1, 4; 703/18

(56) References Cited

U.S. PATENT DOCUMENTS

| | | | |
|---|---|---|---|
| 5,719,800 A | * | 2/1998 | Mittal et al. ............... 713/321 |
| 6,212,665 B1 | * | 4/2001 | Zarkesh et al. ............... 716/4 |
| 6,367,023 B2 | * | 4/2002 | Kling et al. ............... 713/340 |
| 6,598,209 B1 | * | 7/2003 | Sokolov ............... 716/4 |

* cited by examiner

*Primary Examiner*—Vuthe Siek
(74) *Attorney, Agent, or Firm*—Edward C. Kwok; MacPherson Kwok Chen & Heid LLP

(57) ABSTRACT

A system for analyzing the power consumption of a behavior description of an electrical design includes a structural element library including a set of technology-independent structural macro elements, a macro power model module providing macro power models for one or more of the structural macro elements in the structural element library, and a power estimation module providing a power consumption value of the electrical design using a netlist of interconnected components representative of the electrical design, and the macro power models. The macro power models are associated with corresponding power models in a user-specified gate-level power model library. The power analysis system enables behavior level or RTL power analysis using a user-specified gate-level cell power model library containing arc-based or pin-based power model descriptions or both.

50 Claims, 5 Drawing Sheets

RTL POWER ANALYSIS USING GATE-LEVEL CELL POWER MODELS

This application is a continuation of Ser. No. 09/798,016 filed Feb. 28, 2001 now U.S. Pat. No. 6,598,209.

BACKGROUND OF THE INVENTION

1. Field of the Invention

The invention relates to a system and a method for estimating power consumption of a semiconductor chip design, and more particularly to a system and method for estimating power consumption of a semiconductor chip design described at the register-transfer level and using arc-based power models.

2. Description of the Related Art

The advent of wireless and mobile technologies increases the demand for low power integrated circuit designs, particularly for use in battery-powered applications. Because the architectural choices for an integrated circuit (or chip) design often determines it power characteristics, it is becoming imperative to access the power dissipation level of a chip design at an early stage in the design cycle where significant design changes can still be made to optimize the power characteristics.

In a typical design process of an integrated circuit, the chip design, defined by a functional specification and an interface description, is created using a computed aided design tool and expressed at the register-transfer level (RTL) using a hardware description language (HDL), such as Verilog. HDL describes the chip design in behavior terms and does not include detailed structural description of the design. When the designer is satisfied with the design at the register-transfer level, the RTL chip design is then synthesized to transform the behavior description into a circuit level or a gate level description. The circuit level or gate level description can be further optimized and verified before the design is transformed into a mask set for manufacturing the integrated circuit.

In a typical design process, computer-aided design (CAD) tools are generally used to simulate the design defined at RTL to ensure that the design meets the functional and timing requirements of the design. The simulation result may include information that can be used for extracting activity and duty cycle data for the internal nodes of the design. It is also desirable to perform RTL power analysis to access the power consumption level of the design so that optimization can be made to ensure that the final design implementation will meet the power requirements. However, conventional power analysis tools typically analyze a design at the circuit or gate level, thus requiring a designer to make final design choices and fully synthesized the design in order to estimate power. Because design synthesis is a time consuming process, it is often inconvenient and burdensome for a designer to synthesize a design early on in the design cycle in order to access the power consumption level. Also, gate-level power analysis is less useful because, in a design cycle, the design is often modified and the power characteristics need to be reassessed repeatedly.

U.S. Pat. No. 6,151,568 issued to Allen et al., entitled "Power Estimation Software System" (hereinafter "the '568 patent"), describes a method for analyzing the power consumption of an electrical design specified at the register-transfer level (RTL). The power estimation system of the '568 patent predicts the power consumption of a design using information about the switching activity of the design and a power model library. As power dissipation is necessarily a property of structural elements, RTL power analysis generally requires a transformation of an RTL HDL model into a fully structural model that is taken as an approximation of the final design implementation. The '568 patent describes one exemplary method for accomplishing the RTL-to-structural model transformation whereby micro-architectural inferencing is used to generate a netlist composed of macro instances. The '568 patent then proceeds to estimate power dissipation of the structural macro instances based on switching activities and duty cycles of the signals at the periphery of the macro instances.

Generally, a power model of a cell (or a gate) contains one of more descriptions of power dissipating conditions associated with the cell. Two types of cell power models have found widespread use—pin-based and arc-based. Pin-based models describe power dissipation of a cell based on single transitions on one of the cell's pins, possibly under specific Boolean conditions describing the states of the other pins. The pin-based models are easy to evaluate using switching activity and duty cycle data associated with the pins. The evaluation of the power model involves simply using the activity values (that is, the switching activity or the duty cycle) of each pin. However, power estimation based on pin-based power models is known to be less accurate than arc-based power models.

Arc-based power models describe power dissipation of a cell based on a sequence of events (or logical transitions) on the cell's pins. The sequence of events is usually a transition on an input pin followed by a transition on an output pin, called an arc. Hence, the power model is "arc" based. More complicated arc-based power models may reference a sequence of more than two transitions, or include a Boolean condition describing logical states on the cell's pins during this sequence. If a gate-level netlist for a design is available, the arc-based models can be evaluated for power consumption by counting the number of times the specified sequences of transitions (corresponding to the arcs of the cell) actually happened during the period of analysis. It is possible to carry out such an evaluation because the gate-level netlist provides a direct mapping of the instances of the power models to the arc descriptions. However, for RTL power analysis, evaluation of arc-based power models poses a significant challenge because information about the sequence of transitions on the pins cannot be directly derived from activities on the pins of the structural blocks.

Another difficulty of using arc-based power models for RTL power analysis stems from the large variance of syntax used to describe the arcs. Not only are there multiple library formats used by different CAD vendors to describe the power arcs (for example, Advanced Library Format (ALF), Open Library API (OLA), and Synopsys' .lib formats), there could be multiple ways to represent the same arc even within one library format. For example, the ALF format allows the following expressions to be used to describe an input-to-output arc of a 2-input NAND gate having the function $Y=!(A \&\& B)$:

(01A-> 10Y)
(01A-> 10Y && B)
(01A && B)
(10Y && B)

where the symbol "->" denotes a sequence of events, the second event following the first event; and the symbol "&&" denotes a Boolean "AND" condition. A description of the ALF format can be found in Advanced Library Format for ASIC Technology, Cells, & Blocks Version 2.0 available from the EDA Industry Working Groups website (www.eda.org/alf/homepage/alf_2.0.pdf). Other library formats allow similar variance in the power arc descriptions. Thus, for a power analysis tool to support arc-based power models, the tool needs to be able to handle power arc descriptions written in all different library formats and all different variance within the library formats.

Because arc-based power models provide more accurate power estimation, it is desirable to perform RTL power analysis using arc-based power models so that accurate power estimation can be obtained early on in the chip design cycle.

SUMMARY OF THE INVENTION

According to the present invention, a system for analyzing the power consumption of a behavior description of an electrical design includes a structural element library, a macro power model module, and a power estimation module. The structural element library includes a set of technology-independent structural macro elements. The macro power model module provides macro power models for one or more of the structural macro elements in the structural element library. Each of the macro power models is associated with a power model in a user-specified gate-level power model library. Finally, the power estimation module provides a power consumption value of the electrical design using a netlist of interconnected components representative of the electrical design and the macro power models of the structural macro elements. The netlist includes at least one component corresponding to an instance of one of the structural macro elements in the structural element library. The power consumption value is computed based on activity and duty cycle data associated with instances of the structural macro elements in the netlist.

The power analysis system of the present invention enables behavior level or RTL power analysis using a gate-level cell power model library containing arc-based power model descriptions or pin-based power model descriptions or both. Furthermore, the power analysis system of the present invention is capable of supporting arc-based power models written in different formats or written using varying syntax within a format. Thus, the power analysis system can be applied to provide a useful prediction of the power consumption level of a chip design at an early design stage, such as at the register-transfer level, enabling the design of complex low power integrated circuits.

The present invention is better understood upon consideration of the detailed description below and the accompanying drawings.

DETAILED DESCRIPTION OF THE PREFERRED EMBODIMENTS

According to the principles of the present invention, a power analysis system estimates the power consumption of an electrical design, such as an integrated circuit design, specified at the register-transfer level (RTL) using a gate-level cell power model library and simulation data of the design. In one embodiment, the power analysis system creates canonical macro power models based on syntax-specific power models in the gate-level cell power model library. The power analysis tool also transforms the RTL design into structural macro instances which can then be evaluated using the canonical macro power models and available switching activity and duty cycle data for the pins of the macro instances. The power analysis system of the present invention is capable of supporting arc-based gate-level power model libraries and supporting arc-based power models written in different formats or written using varying syntax within a format. The power analysis system of the present invention provides a useful prediction of the power consumption level of a chip design at an early design stage, such as at the register-transfer level, enabling the design of complex low power integrated circuits.

Power Analysis System Overview

Figure 1:
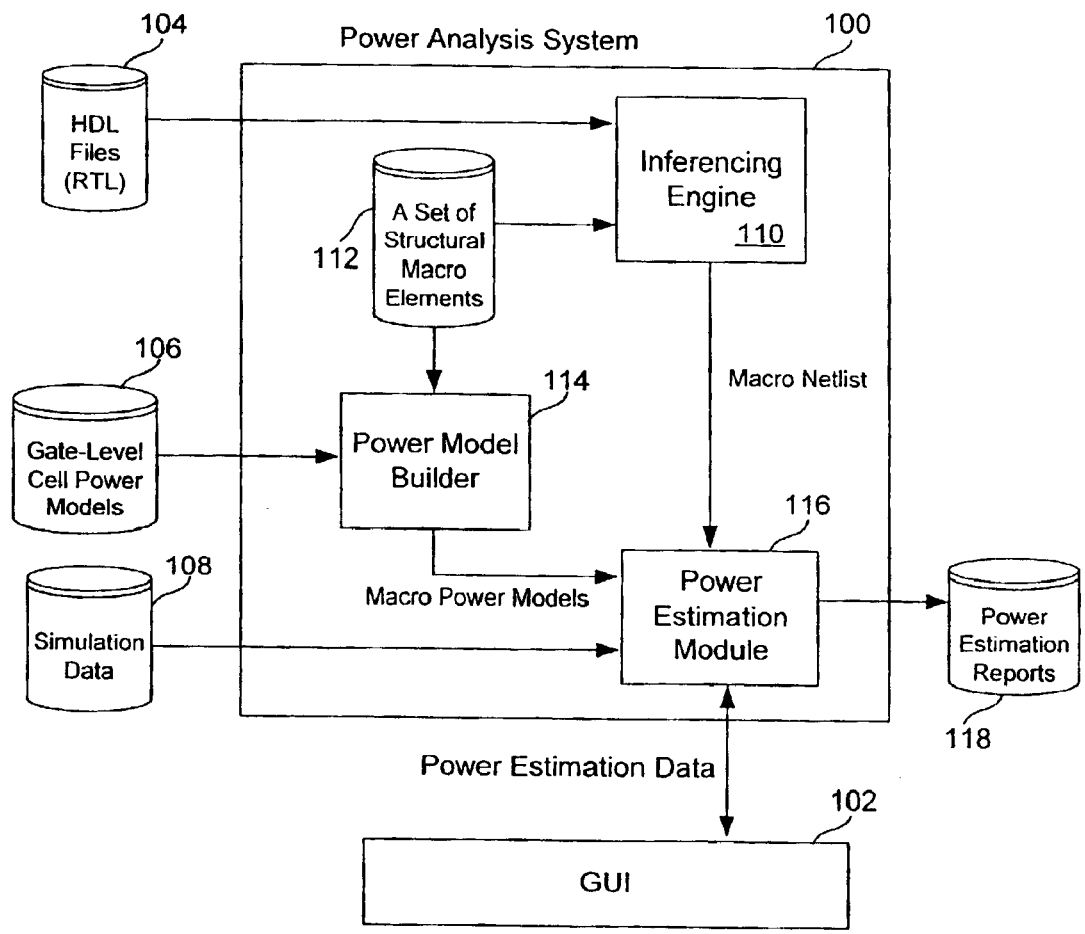
FIG. 1 is a block diagram of a power analysis system according to one embodiment of the present invention.

FIG. 1 is a block diagram of the power analysis system according to one embodiment of the present invention. Referring to FIG. 1, power analysis system 100 includes an inferencing engine 110, an internal library 112 containing a set of technology-independent structural macro elements, a power model builder 114 and a power estimation module 116. Power analysis system 100 can be implemented on a computer, such as a SPARC station available from Sun Microsystems, Inc., Palo Alto, Calif. In the present embodiment, a designer interacts with system 100 using a graphical user interface (GUI) 102. Of course, other means for interacting with power analysis system 100 can be used, such as using operating system level commands including UNIX command line, as is well known in the art.

In the present embodiment, power analysis system 100 analyzes the power dissipation level of an integrated circuit design specified at the register-transfer level (RTL) using a hardware description language (HDL), usually Verilog or VHDL. For example, as shown in FIG. 1, an integrated circuit design specified at the register-transfer level by HDL files 104 is provided to system 100 for power analysis. HDL files 104 describe a circuit design at the functional or behavior level without structural definitions. Power analysis system 100 transforms the HDL model of the design (files 104) into a structural model consisting of macro instances for the purpose of power estimation as will be described in more detail below. Power analysis system 100 estimates the power dissipation of the macro instances of the design based on switching activities and duty cycles of the signals at the periphery of the macro instances. The switching activities and duty cycles information is derived from the simulation data 108 which is also provided to system 100. Simulation data 108 can be generated using any conventional computer-aided design verification tools, such as Verilog HDL and VHDL simulators. Typically, simulation data 108 provides transition and timing information for the internal nodes, or pins, of the chip design.

Power analysis system 100 of the present invention can be used to analyze an entire integrated circuit design or a portion of an integrated circuit design. Of course, power analysis system 100 can also be used to analyze an instance of a circuit block, such as an adder or a control circuit. Basically, power analysis system 100 operates on the circuit description provided by HDL files 104.

Power analysis system 100 estimates power dissipation using gate-level cell power models associated with the design library on which the chip design is based. The vendor-specific technology-dependent power models (such as power models 106) are provided to power analysis system 100 as input files by the designer who typically obtains the power models from vendors of design libraries. The designer can then customize each power analysis by using power models for the particular technology or fabrication process the designer intended to use for the chip design. In the present embodiment, power analysis system 100 supports power models containing either arc-based descriptions or legacy pin-based descriptions, thus enabling the power analysis system to work with a wide variety of power model libraries. As will be described in more detail below, power analysis system 100 uses a subset of gate-level cell power models 106 to build a macro power model library including power models for the primitive macros in the set of structural elements in library 112.

Appendix A includes an exemplary gate-level power model for a 2-input nand gate written in the ALF format. The nand gate cell power model in Appendix A includes eight power arcs denoted by the statement "VECTOR" and their associated power levels. Each of the power arcs describes one power dissipating event associated with the nand gate. Power dissipation level for each of the arcs is given for a range of slew rate or a range of output pin capacitance values or both. Specifically, the power arcs defined in the nand gate cell power model are given as follows:

(01 A1-> 10 Z1 && B1);
(10 B1-> 01 Z1 && A1);
(01 B1 -> 10 Z1 && A1);
(10 A1 -> 01 Z1 && B1);
(10 B1 && !A1);
(01 A1 && !B1);
(10 A1 && !B1); and
(01 B1 && !A1);

where A1 and B1 are the input pins and Z1 is the output pin. Furthermore, the power model for the nand gate in Appendix A also includes power dissipating events written in pin-based description as follows:

(01 A);
(10 A);
(01 B)
(10 B); and
(?0 Z || ?1 Z);

where A and B are the input pins and Z is the output pin.

Arc descriptions in the vendor-supplied power models, such as power models 106, can be provided in various library formats and various syntax within a library format. According to the present invention, power model builder 114 of power analysis system 100 creates canonical macro power models based on the vendor-supplied power models 106 and uses the canonical macro power models for RTL power analysis. The use of canonical macro power models in power analysis system 100 enables the system to support multiple power model library formats and eliminate problems due to syntax variance within a single format. More importantly, power analysis system 100 can support a vendor-supplied power model library even when the library contains power models written in different formats. Thus, power analysis system 100 can operate on gate-level cell power models written in different format at the same time. Power analysis system 100 provides flexibility and ease of use to designers in power estimation.

Figure 2:
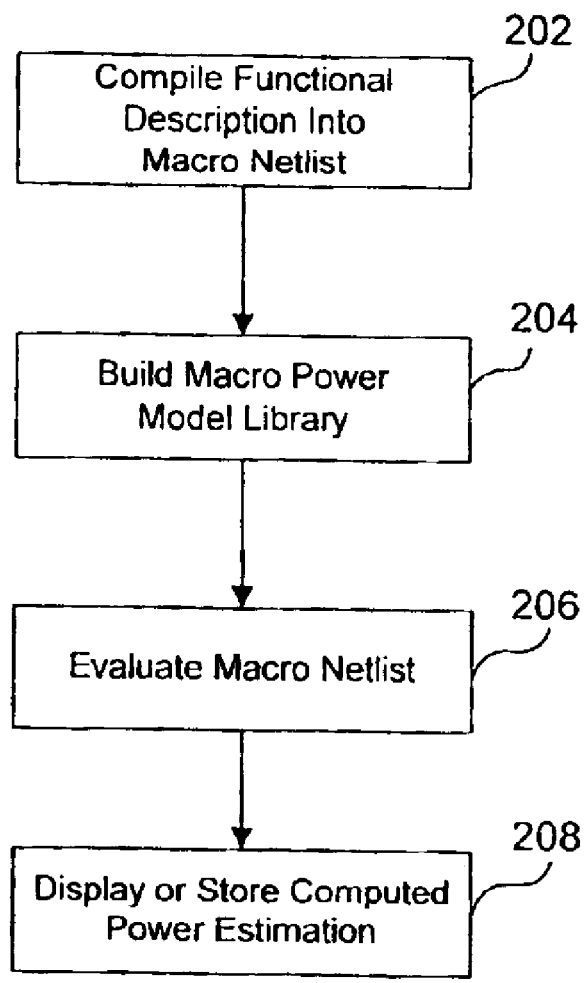
FIG. 2 is a flow chart illustrating the process employed by the power analysis system of FIG. 1 to estimate the power consumption of an integrated circuit design according to one embodiment of the present invention.

Power estimation module 116 of power analysis system 100 evaluates the power dissipation level of an integrated circuit design using gate-level power models 106 and simulation data 108 generated by the designer for the design. The simulation data provides information about the switching activities and duty cycle of the nodes in the design. In the present description, the switching activity of a pin or a node is usually defined as the ratio of the average frequency of switching on the pin to the main clock frequency; and the duty cycle of a pin or a node is defined as the percentage of time the pin is in the logical "high" state. FIG. 2 is a flow chart illustrating the process employed by power analysis system 100 to estimate the power consumption of an integrated circuit design according to one embodiment of the present invention.

Micro-Architectural Inferencing

In the present embodiment, power analysis system 100 estimates the power dissipation level of an integrated circuit design specified at RTL and described in HDL files 104. As mentioned above, HDL files 104 may contain an entire integrated circuit design or a part of the design. Power analysis system 100 includes inferencing engine 110 for transforming the RTL design description into a netlist of structural elements to facilitate power analysis. In the present embodiment, inferencing engine 110 uses a micro-architectural inferencing technique for the RTL-to-structural model transformation which generates a macro netlist of the design. In operation, inferencing engine 110 analyzes the RTL design description (HDL files 104) using conventional RTL synthesis rules and performs a mapping of the RTL HDL statements to the set of technology-independent structural macro elements defined in library 112. The structural elements selected from the set of structural macros are then connected together according to the specification embodied in the RTL description to generate the macro netlist. In the present embodiment, it is assumed that all synthesizable RTL descriptions can be fully mapped to a netlist comprised of elements of the set (library 112).

In the present embodiment, the set of structural macro elements in library 112 includes two types of structural macros: primitive macros and complex macros. The primitive macros of the set comprise the following: Inverter, NAND, XOR, 2-1 Multiplexor, Latch, Flip-Flop, Adder, and Tri-State Driver. The functionality of each of the primitive macros should be expressible as a Boolean function or a state table. In fact, the primitive macros are generic elements representing gates or cells that are typically used in integrated circuit design. On the other hand, the complex macros include the following: Decoder, Comparator, Multiplier, Unencoded Multiplexor, Register_File, and Latch_File. The functionality of the complex macros can also be expressed as a Boolean function or a state table. However, in the present embodiment, the functionality of the complex macros is expressed as a sub-netlist of interconnected primitive macros.

All macros in the set (library 112) are parameterizable either by the bitwidth (2-1 Multiplexor, Latch, Flip-Flop, Adder, Tri-state Driver, Comparator, Multiplier) or by the number of inputs (NAND, XOR, Decoder, Unencoded Multiplexor). For the group of macros parameterizable by bitwidth, the base macro is assumed to have a bitwidth of one. For the group of macros parameterizable by the number of inputs, the base macro is assumed to have the minimum possible number of inputs, which is two. Of course, in other embodiments, library 112 may include other structural macro elements to support different integrated circuit design applications.

Thus, at step 202 of FIG. 2, inferencing engine 110 operates on HDL files 104 to generate the structural macro netlist based on the set of structural macro elements (library 112). The macro netlist basically includes interconnected components of the primitive macros or the complex macros. The macro netlist is provided to power estimation module 116 for power analysis. The reference "HDL Chip Design: A Practical Guide for Designing, Synthesizing & Simulating ASICS & FPGAS Using VHDL or Verilog," by Douglas J. Smith, Doone Publication, March 1998 (ISBN: 0965193438), provides guidance and examples for implementing an inferencing engine according to the present invention. In the present embodiment, inferencing engine 110 is implemented in the same manner as the micro-synthesis module described in the '568 patent. A software module for performing the micro-architecture inferencing process and generating the macro netlist in accordance with the present invention is also available from Sequence Design, Inc., Santa Clara, Calif.

Figure 5:
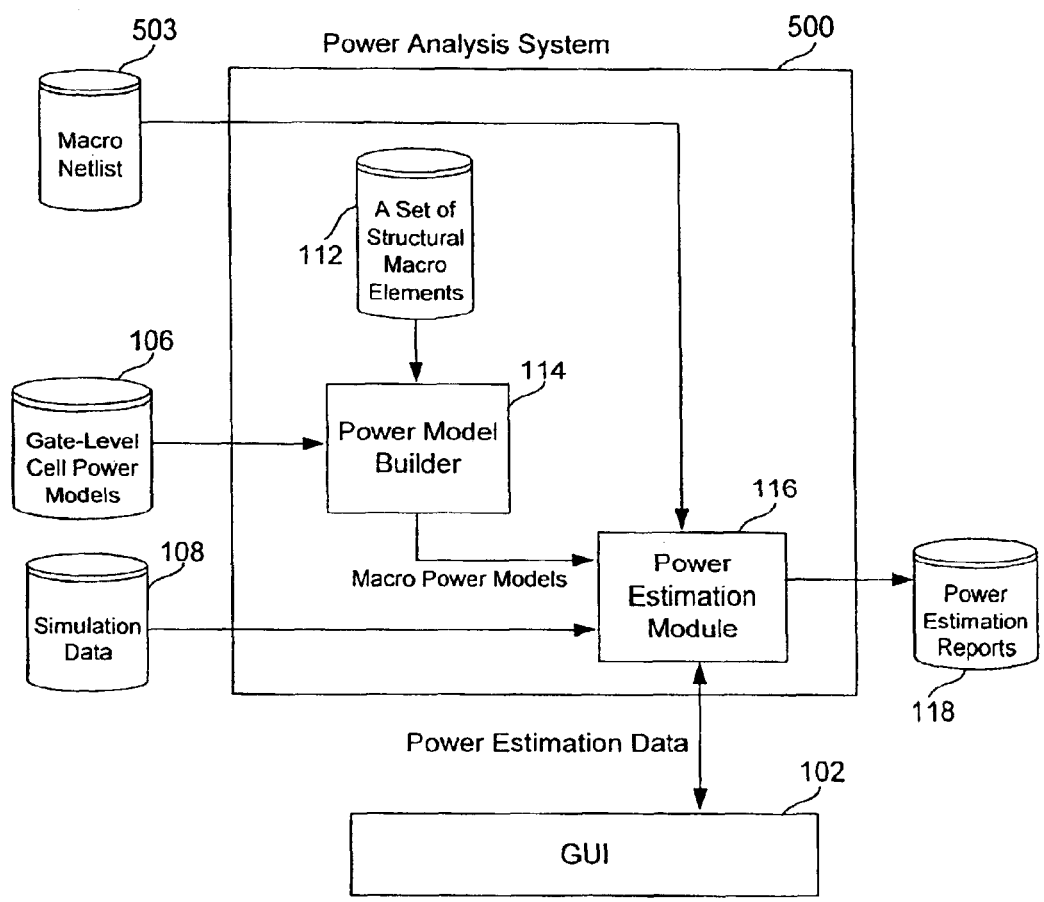
FIG. 5 is a block diagram of a power analysis system according to another embodiment of the present invention.

In the present embodiment, power analysis system 100 includes inferencing engine 110 for transforming a behavior description of a chip design, such as a design specified at the register-transfer level by HDL files 104, into a macro netlist based on the set of structural macro elements in library 112. However, in other embodiments, inferencing engine 110 is an optional component of the power analysis system as long as a netlist based on the structural macro elements in library 112 is provided to the power analysis system. FIG. 5 illustrate a block diagram of a power analysis system 500 according to an alternate embodiment of the present invention where a macro netlist (file 503), instead of a behavior description in HDL files, is provided to the power analysis system. Like elements in FIGS. 1 and 5 are given like reference numerals. In the alternate embodiment of FIG. 5, a macro netlist (file 503) representative of the chip design of interest is generated by the designer and provided to power analysis system 500. Specifically, the macro netlist (file 503) is provided to power estimation module 116 for power analysis as will be described in more detail below. The macro netlist (file 503) must be generated based on the set of structural macro elements defined in library 112. Such a macro netlist can be generated in a conventional manner, including drawing by hand or using a netlist generator.

In some cases, a designer is only able to generate a netlist representative of the behavior description of the design using a vendor-supplied cell library. In those cases, the designer may use a netlist processor to transform the netlist based on vendor-specific cell library into a macro netlist based on the set of structural macro elements as required by power analysis system 500. In yet another embodiment of the present invention, a power analysis system may include a netlist processor for transforming a netlist representation of a chip design into a macro netlist based on the set of structural macro elements. Netlist processors are well known in the art and any conventional implementation of a netlist processor may be used for providing a macro netlist for the purpose of estimating power consumption using the power analysis system of the present invention.

Building Macro Power Model Library

As described above, power analysis system 100 estimates power consumption using vendor-specific technology-dependent gate-level cell power models, such as power models 106, typically provided by the designer. Generally, vendors of CAD design libraries supply power models for a vast number of specific one-bit-wide logical gates and memories. The vendor-supplied power models will not contain power models corresponding to generic elements such as the primitive macros in the set of structural elements defined and used by power analysis system 100 for power estimation. Therefore, power analysis system 100 constructs power models for the primitive macros in the set of structural elements (the primitive power models) for use in the RTL power analysis of the RTL chip design.

Figure 3:
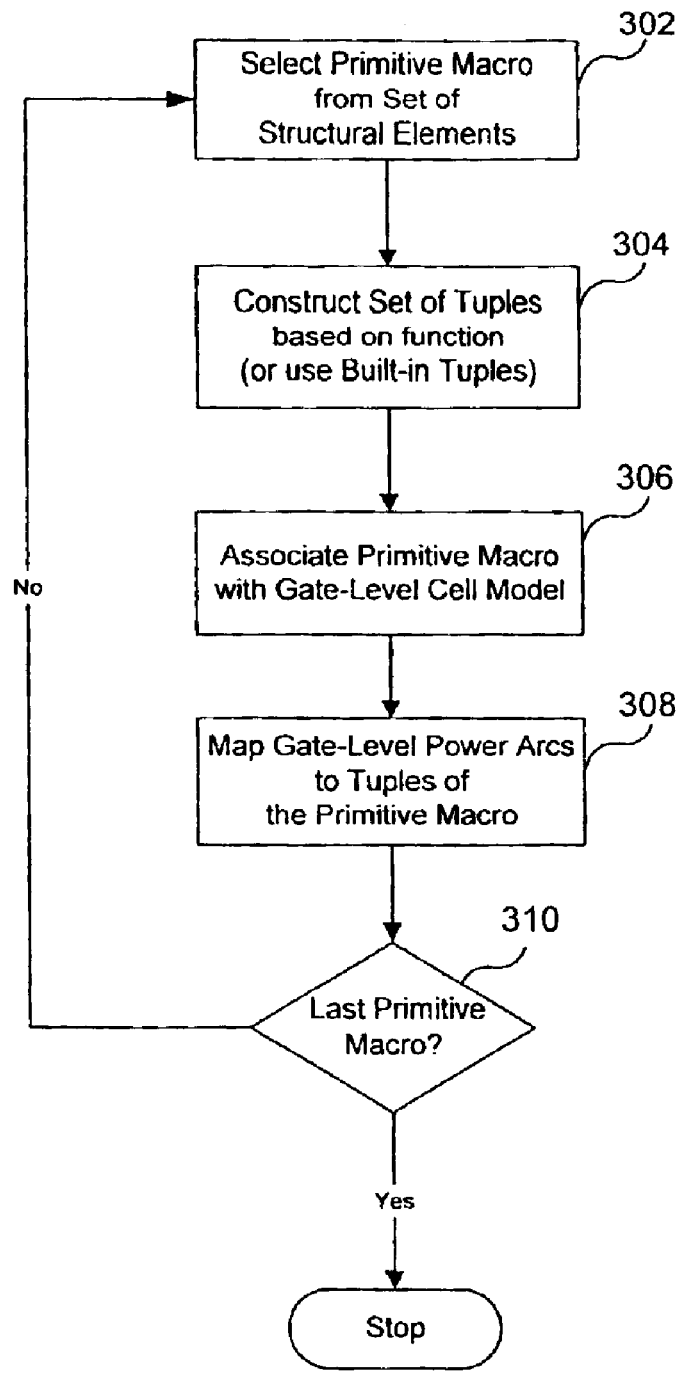
FIG. 3 is a flow chart illustrating the process of building a macro power model library according to one embodiment of the present invention.

Thus, at step 204 (FIG. 2), power model builder 114 of power analysis system 100 builds a macro power model library based on gate-level cell power models 106. As described above, gate-level cell power models 106 may include power model descriptions written in any formats or in multiple formats. In the present embodiment, a power model is built for each of the primitive macros specified in the set of structural macro elements (library 112). The macro power model library is used together with the macro netlist for power analysis in power estimation module 116 as will be described in more detail below. FIG. 3 is a flow chart illustrating the process of building a macro power model library according to one embodiment of the present invention.

At step 302 of FIG. 3, a primitive macro from the set, such as the NAND primitive macro, is selected. At step 304, power model builder 114 constructs a set of tuples for the selected primitive macro. In the present description, a tuple is a vector representation describing conditions on each pin of a cell which conditions describe a valid transition of the cell. The set of tuples is constructed based on the function of a cell or gate, or a group of cells or gates, associated with the selected primitive macro. Because the primitive macros are intended to be generic elements, the function of a primitive macro is defined so as to cover all of the typical variations on the associated cell. In the alternate, a built-in set of tuples can be used. In the present embodiment, a set of tuples is constructed which describes all valid transitions of the selected primitive macro. Of course, a set of tuples can include only a subset of the valid transitions only.

To construct a set of tuples for the selected primitive macro, power model builder 114 defines a space of valid logical transitions based on the function of the selected primitive macro. The space has a dimension typically equaling the number of pins of the associated cell, but may include some optional pins. Thus, in the present example, for the NAND primitive macro, a space of valid logical transitions is defined based on the function of the 2-input nand cell associated with the NAND primitive macro. The 2-input nand cell, having two input pins and one output pin, will be defined by a three-dimensional transition space. On the other hand, for the Flip-Flop primitive macro, the space of valid logical transitions is defined based on the function of a generic flip-flop cell associated with the Flip-Flop primitive macro. A generic flip-flop cell includes at least the data input pin, the data output pin, the invert-data output pin and the clock pin. However, some flip-flop cells also include a set pin, a reset pin and an enable pin. Thus, in the present embodiment, a generic flip-flop cell is defined by a seven-dimensional transition space including three optional pins. As will be described in more detail below, when the primitive macro is associated with a particular gate-level cell model in the power model library 106, the optional pins of the tuple will be ignored in the power estimation process if the particular gate-level cell model does not include the optional pins.

Each symbol position in a tuple defined for a primitive macro is uniquely associated with a pin of the associated cell. The following symbols are used to represent possible discrete values for each dimension in the transition space:

0—static Boolean low;
1—static Boolean high;
Z—static tri-state condition;
?—static don't care (i.e., any static value);
U—rising transition (0 -> 1); and
D—falling transition (1 -> 0).

Each tuple can be written as a string of symbols which represents either a transaction or a stable state of a macro. In the present description, a tuple representing a transaction is referred to as a dynamic tuple, and a tuple representing a stable state is referred to as a static tuple.

A transaction is defined as a complete sequence of transitions on the cell's pins. A transaction encoded in a dynamic tuple may include just one transition (i.e., one pin changes logical value while others remain stable), or combine one transition on an input pin with one or more resultant transitions on the output pins. In the present embodiment, only dynamic tuples representing transactions not having more than one input transition are used. However, in other embodiments, dynamic tuples representing transactions with multiple input transitions can be included. A stable state, on the other hand, is defined as the conditions where all pins remain at steady logical values.

As each dynamic tuple represents a transaction, each dynamic tuple can be associated a transaction count number representing how many times the transaction has been observed in an observation period. On the other hand, each static tuple can be associated a duty cycle number which represents the percentage of time the static values on the pins satisfied the conditions represented by the tuple.

In addition to defining tuples as dynamic and static, tuples can also be classified based on the types of available gate-level power models. Thus, according to the present invention, the tuples can also be classified as follows:

(1) Full-arc tuples—corresponding to cell power models that utilize full power arcs;

(2) Half-arc tuples—corresponding to cell power models that use incomplete descriptions of arcs (e.g., power models including either the initial or the final segment of the arc). Each full-arc tuple that contains two or more pin transitions (e.g., one transition on an input pin and one or more transitions on output pins) can be represented as two half-arcs, with one half-arc describing the input transition part, and the other half-arc describing the output transition part; and (3) Pin-based tuples—corresponding to the cell power models that are pin-based.

Appendix B below includes exemplary tuple definitions for the primitive macros in the set of structural macro elements. For example, a set of tuples for the NAND primitive macro is given as follows:

---

NAND (IN1, IN2, OUT)
Function: OUT = ! (IN1&IN2);
Dynamic tuples:
// arc-based model
"1DU", "1UD", "D1U", "U1D", // re-mapped to "??U",
    "??D"
"0U1", "0D1", "U01", "D01",
// pin-based model

---

-continued

"??U", "??D", "?U?", "?D?", "U??", "D??"
Static tuples:
"001", "011", "101", "110"

---

In the present example, the set of tuples for the NAND primitive macro includes dynamic tuples which are either arc-based or pin-based and also includes static tuples. Also in the present example, certain arc-based dynamic tuples are subjected to an optional remapping operation. The remapping operation is an optimization routine and will be described in more detail below.

After the set of tuples is constructed for the selected primitive macro, the selected primitive macro is associated with a gate-level cell model from the gate-level cell power models 106 (step 306 of FIG. 3). In the association process, the gate level cell model must have a function corresponding to the primitive macro. For example, the NAND primitive macro is associated with a 2-input nand cell in power models 106. The association for all of the primitive macros can be accomplished using a text file, determined automatically via library analysis, or by other means.

Mapping Gate-Level Power Models to Tuples

At step 304 of FIG. 3, a set of tuples is constructed for the selected primitive macro that completely represents all of the valid transactions and states of the cell model. At step 306, the selected primitive macro is associated with a cell model in the power model library 106. Then, at step 308, a power-model-to-tuple mapping operation is performed to complete the definition of the power model of the selected primitive macro. For each primitive macro, the mapping operation maps the power arcs (in power models 106) of the associated cell model to the tuples defined for the primitive macro. Thus, the mapping operation creates power models for each primitive macro in the set of structural macro elements. The power model for a selected primitive macro is completely defined when all power arcs of the associated cell model are mapped to the tuples associated with the primitive macro. The mapping operation reduces vendor-supplied gate-level power models to a common canonical form represented by tuples. Thus, the problem caused by different formats and syntax variability of power models used by the different CAD vendors is obviated.

In the mapping operation, a power arc for a cell model may get mapped to one or more tuples in the set of tuples constructed for the primitive macro. When a power arc maps to more than one tuple, each of the tuples represents part of the transition of the power arc and the sum of all the tuples represents all of the transitions of that power arc. In the present embodiment, the mapping operation follows the rules given below. Exemplary applications of the rules are also given for a 2-input nand cell power model (Appendix A) mapping to the tuples of the NAND primitive macro (Appendix B).

(1) For an arc to be mapped to a tuple, it is necessary all conditions represented in the arc be associated with the elements of the tuple. For example, the arc (01A1 && B1 && !Z1) for a 2-input nand cell is a half arc describing a valid transition where there is a change in the state of input pin A1 without any corresponding change in the output pin Z1. This arc does not map to the tuple "U1D" for the NAND primitive macro because the condition on the output pin Z1 does not match. The tuple "U1D" describes a condition where a low to high transition on the first input pin results in a corresponding high to low transition on the output pin. Thus, an arc can be mapped to a tuple only when the tuple contains all the conditions of the arc.

(2) For an arc to be mapped to a tuple, it is sufficient that one or more elements of the tuple correspond to the conditions of the arc. For example, the arc (01A1 && B1) describing a low-to-high transition on input pin A1 while B1 is at a high logical state can be mapped to the tuple "U1D" because the elements "U1" of the input pins in the tuple correspond to the conditions of the arc.

(3) A power arc description containing only one pin transition shall be mapped to a pin-based tuple. Thus, an arc (01 A1) will be mapped to the tuple "U??" which is a pin-based tuple describing a transition on the first input pin only.

(4) A power arc expression containing more than one primary shall be mapped to an arc-based tuple. Thus, an arc (01A1 && B1) containing two primaries will be mapped to the tuple "U1D" which is an arc-based tuple describing transitions on the first input pin of the NAND gate.

(5) Any condition for a pin in a power arc matches the don't care '?' symbol in a tuple.

While in the present description, the five rules described above are used in the mapping operation for mapping the power arcs of a cell power model to the tuples of the corresponding primitive macros, one of ordinary skill in the art would appreciate that in other embodiments, a subset of the aforementioned rules can be used or other rules can also created depending on the applications of power analysis system 100. The following table provides an example of the mapping operation of the power arcs for a 2-input nand cell, including the power arcs contained in Appendix A for the nand cell model, to the tuples of the NAND primitive macro given above:

| Arc expression | NAND Tuple Mapping |
| --- | --- |
| Pin-based model: | |
| ( 01 A ) | "U??" |
| ( 10 A ) | "D??" |
| ( 01 B ) | "?U?" |
| ( 10 B ) | "?D?", |
| ( ?0 Z ‖ ?1 Z ) | "??U", "??D" |
| Arc-based model: | |
| ( 01 A1 -> 10 Z1 && B1 ) | "U1D" |
| ( 10 B1 -> 01 Z1 && A1 ) | "1DU" |
| (01 B1 -> 10 Z1 && A1 ) | "1UD" |
| ( 10 A1 -> 01 Z1 && B1 ) | "D1U" |
| ( 10 B1 && !A1 ) | "0D1" |
| ( 01 A1 && !B1 ) | "U01" |
| ( 10 A1 && !B1 ) | "D01" |
| ( 01 B1 && !A1 ) | "0U1" |

When all of the power arcs in the cell power model are mapped to the tuples using the rules given above, the power model of the selected primitive macro is complete. The process of building the macro power model library repeats (step 310) for the next primitive macro in the set of structural models(library 112). The progress of building the primitive power models is complete when primitive power models are built for all of the primitive macros in the set.

In one embodiment, the mapping operation of step 308 can be implemented using the pseudo-code below:

```
For each arc of the model
    Produce a list of state/transition
    conditions for all the pins included in the
    description of the arc
    If the arc is pin-based (only one pin
    involved)
        Select the set of pin-based tuples of
        the macro model
        MapArcUsingSelectedTupleSet
    Else
        Select the set of arc-based tuples of
        the macro model
        MapArcUsingSelectedTupleSet
        If no match with any tuples was found
            Select the set of half-arc tuples of
            the macro model
            MapArcUsingSelectedTupleSet
    Take next arc
MapArcUsingSelectedTupleSet:
    For each tuple from the selected set
        If all pin conditions of the arc match the
        tuple
            Save the mapping
        Take next tuple
```

In the process of FIG. 3, the process flow for building the macro power model library is described as selecting a primitive macro and building the power model for one primitive macro at a time. Of course, the process flow of FIG. 3 is illustrative only and one of ordinary skill in the art would appreciate that other process sequence is possible, such as processing all of the primitive macros at each step of the process in FIG. 3. Thus, in another embodiment, step 302 selects all of the primitive macros in the set and at step 304, a set of tuples is constructed for each of the primitive macros. Then, at step 306, each of the primitive macros is associated with a cell model in the gate level power model library 106. Finally, at step 308, the power arcs for each of the associated cell models are mapped to the tuples of the corresponding primitive macros.

In other embodiments of the present invention, an optional remapping step can be applied after the mapping operation in step 308 of FIG. 3. In the remapping step, power arcs mapped to tuples meeting certain criteria are remapped to other tuples. The selection of the remapped tuples is driven largely by either software optimizations or other heuristics that are based, for example, on studies of accuracy of power estimation for test designs. Generally, the remapping step may result in more than one arc getting mapped to the same tuple. In one embodiment, the following types of remapping operation is performed:

(1) Arcs mapped to half-arcs are moved to the corresponding full arcs.

(2) For the NAND and XOR primitive macros, arcs mapped to full-arc tuples containing a transition on the output are remapped to the pin-based tuples with the same transition on the output.

Thus, in the tuple definition given above for the NAND primitive macro, the full-arc tuples "1DU" and "D1U" are re-mapped to pin-based tuple "??", while the full-arc tuples "1UD" and "U1D" are re-mapped to tuple "??D".

Evaluation of Macro Netlist

Returning to FIG. 2, with the macro netlist generated and the macro power model library defined, power analysis system 100 proceeds to evaluate the macro netlist and compute the power dissipation level of the design (step 206). In the present embodiment, power dissipation of an instance of a primitive macro can be estimated using switching activities and duty cycles of all the pins of the primitive macro. The switching activities and duty cycles information can be supplied by the designer, obtained from simulating the RTL description using conventional simulation tools, or calculated from available simulation data using known probabilistic activity propagation techniques. In the present embodiment, the algorithms for activity propagation as described in Farid N. Najm, "Transition Density: A New Measure Of Activity In Digital Circuits," IEEE Trans. CAD, vol. 12, no.2, pp. 310–323, February 1993, and in Farid N. Najm, "Low-pass Filter for computing the Transition Density in Digital Circuits," IEEE Trans. CAD, 1994, are used to provide activity and duty cycle values for pins where actual simulation data is not available. In the following description, simulation data 108 is used collectively to refer to simulation data obtained from any sources from which switching activities and duty cycle information can be derived.

Figure 4:
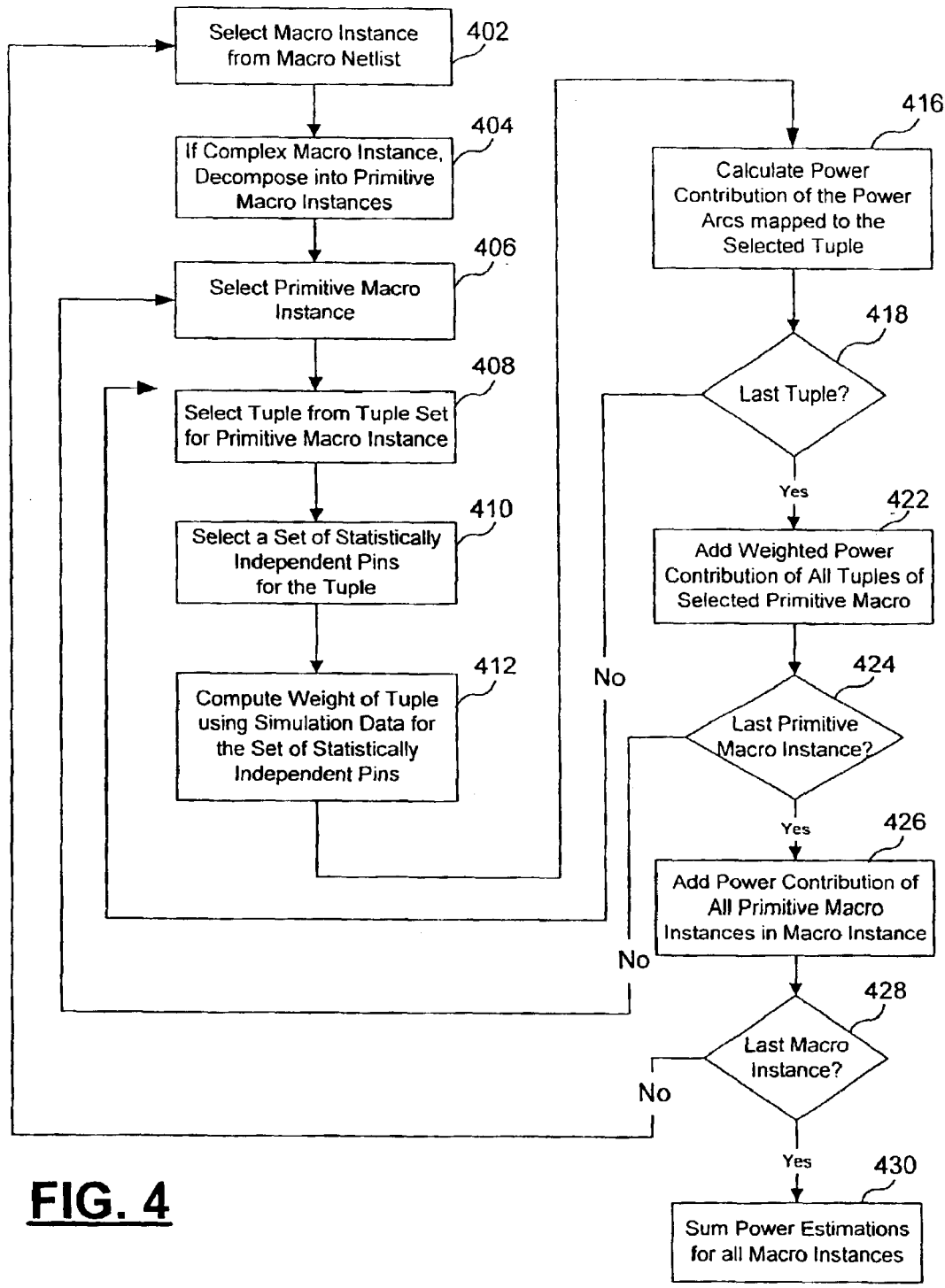
FIG. 4 is a flow chart illustrating the process for evaluating the macro netlist and computing the power consumption of an integrated circuit design according to one embodiment of the present invention.

FIG. 4 is a flow chart illustrating the process for evaluating the macro netlist and computing the power estimation for the netlist. Referring to FIG. 4, the evaluation process selects a macro instance from the macro netlist (step 402). If the macro instance is a complex macro, then the complex macro instance is decomposed into primitive macro instances (step 404). The evaluation process continues by selecting a primitive macro instance within the macro instance (step 406). Of course, if the macro instances is a primitive macro instance, then the macro instance includes only one primitive macro and the one primitive macro is selected.

Once a primitive macro instance has been selected, for example, the NAND primitive macro instance, the power model for the selected primitive macro is evaluated using switching activities and duty cycle information for the primitive macro instance. Specifically, the simulation data is used to calculate the weight of each of the tuples in the set of tuples which have been mapped to the power arcs of the cell power models associated with the primitive macro. For example, for the NAND primitive macro, the weight of each of the thirteen tuples mapped to the power arcs of the nand cell power model in Appendix A is computed. Thus, the evaluation process of FIG. 4 continues with selecting a tuple from the power model of the selected primitive macro (step 408), selecting a set of statistically independent pins for the tuple (step 410), and computing the weight of the tuple using simulation data for the set of statistically independent pins. (Step 412).

Selecting Set of Statistically Independent Pins

At step 410 of FIG. 4, to calculate the weight of the selected tuple, power analysis system 100 assumes that within each tuple, there is a set of pins whose transitions and states are effectively statistically independent. Then, using Probability Theory, the weight of the tuple is proportional to the product of the probabilities for each of the set of statistically independent pins to be in the state defined by the tuple. The probability values for the pins of a tuple are, in turn, calculated based on the switching activity and duty cycle information for the pins.

In the present embodiment, for combinational primitive macros, all input pins are assumed to be statistically independent. The transitions and states of the output pins are determined by those of the input pins, through the macro's function, resulting in statistical dependency between the set of input pins and the set of output pins. Hence, the weights for the tuples of the combinational primitive macros (i.e. Inverter, NAND, XOR, 2-1 Multiplexor, Tristate-Driver, Adder) are calculated based only on the statistics of the input pins, or only on the statistics of the output pins. Whether to use the statistics on the input or output pins for tuple evaluation is determined based on the correlation analyses for the particular types of primitive macros. For example, for a NAND gate, the statistics of the input pins are used as opposed that of the output pins. In another embodiment, it is also possible to use the average of the tuple weights computed using activity and duty cycle data based on the input pins and the output pins, or any other combinations of the two. In yet another embodiment, power analysis system 100 uses the statistics of the input pins for each tuple by default. The selection can be altered to use the statistics of the output pins as needed for optimization.

The determination of the set of statistically independent pins for tuples of a sequential primitive macro (e.g. Latch and Flip-Flop) is more complex. For sequential gates, there exists a dependency of the output transitions and states on the previous state of the gate as well as the current state of the input pins. Hence, the spatial correlation of the output values and the input values of a sequential gate is much weaker than with a combinational gate. However, in some sequential gates, certain functional input pins of the gate directly determine the values of the output pins. For example, an asynchronous reset input pin of a Flip-Flop directly determines the state of the output pin of the Flip-Flop. Therefore, in accordance with the present invention, for sequential primitive macros, the set of statistically independent pins is determined separately for each tuple. For example, for tuples that do not include transitions on set/reset/enable pins, the set of output pins is taken as the statistically independent pins for the purpose of calculating the tuple's weight. Otherwise, the set of input pins is used as the set of statistically independent pins. Appendix C below provides examples of the selection of statistically independent pins and the corresponding calculation of tuple weights for the Flip-Flop and Latch sequential gates. Appendix C also includes descriptions of optimizations which are used in one embodiment of the present invention to calculate the tuple weights for an Adder, a Flip-Flop, a Latch, and a 2-1 Multiplexor (MUX) primitive macros.

Computing the Weights of Tuples

After the set of statistically independent pins has been selected (step 410) for the selected tuple, power analysis system 100 proceeds to compute the weight of the selected tuple using simulation data 108. For dynamic tuples, the weight of the tuple is the expected frequency of occurrence of the transaction represented by the tuple relative to the clock frequency. For static tuples, the weight is the expected fraction of time that the macro instance spends in the state defined by the tuple.

An exemplary algorithm for computing the weights of the tuples in the present embodiment is given in a code listing in Appendix D. The algorithm takes the tuple definition, the duty cycle data and the activity data for the pins of the tuple as input values and compute an output value "product" representing the weight of the tuple. In the algorithm of the present embodiment, the weight of the selected tuple is assigned a weight of "1" initially. Then, depending on types of the primitive macros, the weight is adjusted using either simulation data on the input pins, or simulation data on output pins. The weight of the tuple is then computed using the following rules which are implemented in the algorithm in Appendix D:

(1) In the tuple definition, the 'U' or 'D' symbol for a pin causes the weight of the tuple to be multiplied by the probability of the pin rising or falling during the period of analysis. Typically, the period of analysis consists of one clock cycle. The probability of the pin rising or falling is given as one half of the switching activities of the pin as the switching activities of a pin typically includes the sum of the rising and falling transitions;

(2) A '1' symbol for a pin in the tuple causes the weight of the tuple to be multiplied by the duty cycle of the pin;

(3) A '0' symbol for a pin in the tuple causes the weight of the tuple to be multiplied by the complement of the duty cycle of the pin;

(4) A 'Z' symbol for a pin in the tuple causes the weight of the tuple to be multiplied by the fraction of the total analysis time that a pin was in a high-impedance state; and (5) A '?' symbol for a pin in the tuple does not alter the weight of the tuple.

An example applying the weight computation algorithm above for computing the weight of a "U1D" tuple of a NAND primitive macro is now described. In the present example, assuming that from the simulation data, input pin A1 of the NAND model has an activity value of 0.5 and a duty cycle value of 0.5, input pin B1 has an activity value of 0.1 and a duty cycle value of 0.4, and output pin Z1 has an activity value of 0.2 and a duty cycle value of 0.7, the weight of the "U1D" tuple can be calculated as:

$$\text{weight (tuple } "U1D") = \frac{1}{2}\text{Act}(A1) \times \text{Duty}(B1) = 0.5 \times 0.5 \times 0.4 = 0.1,$$

where Act (A1) denotes the activity value of pin A1, and Duty (B1) denotes the duty cycle value of pin B1.

After the weight is computed (step 412), the weight of the tuple is translated to the weight of the associated power arc and the power contribution by the power arc of the cell model is calculated (step 416). For instance, in the present embodiment, the power contribution by the power arc associated with the tuple is computed by multiplying the weight of the tuple with the energy value of the power arc. Referring to the above example for the "U1D" tuple which is mapped to the "(01 A1 -> 10 Z1 && B1)" power arc in the NAND gate power model, the power contribution of the tuple is the energy value 11.0278E-13 (Appendix A) multiplied by 0.1, assuming an output pin capacitance value of 3E-14 and a slew rate of 3E-10.

In the present embodiment, certain rules are applied to translate the weight of the tuple to the associated power arc. First, for tuples with "don't care" symbols ('?'), the tuple's weight is uniformly split between all power arcs mapped to the tuple. Second, for tuples with no "don't care" symbols, the tuple weight gets assigned to each power arc mapped to the tuple.

The evaluation process continues by computing the weight of the next tuple (step 418), if any, until the weight of all of the tuples is computed. Then, the expected power dissipation level of the selected primitive macro instance is a weighted sum of the power contributions of each of the power arcs associated with the tuples of the primitive macro instance (step 422).

In the above description, it is assumed that the primitive macro (such as the NAND gate) has the same bitwidth as the gate-level cell power model (2-input nand cell). Therefore, the power estimate for the tuples of the primitive macro can be computed directly from the energy value of the cell power model. However, in cases where an instance of a primitive macro has a higher bitwidth or higher number of inputs than the associated gate-level cell, the power estimate is interpolated from that of the base primitive macro. For example, if an instance of a NAND macro model in the macro netlist has eight input pins and the base NAND primitive macro includes on two input pins, power estimation module 116 estimates the number of two-input NAND primitive macro that are required to implement the eight-input instance. The power dissipation level of the NAND primitive macro is evaluated using the average simulation data for the eight-bit instance. The power estimate is then adjusted by the number of base primitive macros required to implement the eight-bit instance. The general interpolation approach described herein can be fine-tuned using various heuristics based on correlation experiments to improve the accuracy of the power estimation.

After the power contribution of all tuples of the selected primitive macro instance is computed and summed (step 422), the evaluation process continues with the next primitive macro instance in the macro instance (step 424), if any. After all of the primitive macro instances in the selected macro instance have been evaluated, the power contribution for the selected macro instance can be computed (step 426) and the evaluation process proceeds to the next macro instance in the macro netlist(step 428). The estimated power dissipation level for the design is the sum of the power dissipation of all the macro instances of the macro netlist (step 430). The power estimation data for the design can be provided to the designer either by displaying the power value on GUI 102 or by storing the result in a data base 118 as power estimation reports (step 208 of FIG. 2).

The evaluation process described in FIG. 4 is illustrative only and other evaluation sequence can be used to compute the weight of the tuples of each primitive instances and obtain the resultant power contribution of the associated power arcs in the gate-level cell power models.

Evaluating Power Dissipation of Complex Macros

In the set of structural macro elements (library 112), a number of complex macros are also defined and includes elements such as a decoder and a comparator. In the present embodiment, the complex macros are expressed as sub-netlists of interconnected primitive macros. Therefore, the power analysis of an instance of a complex macro can be effectively reduced to power analysis of the primitive macros contained in the complex macro. In the present embodiment, it is assumed that a complex macro parameterized by bitwidth will utilize similar parameterization in the corresponding primitive macros.

To compute the power dissipation level of an instance of a complex macro, activity and duty cycle data for the pins of the complex macro instance are assumed to be available from simulation, user input, or as an outcome of statistical activity propagation as described above. Then, power estimation module 116 uses statistical activity propagation technique to obtain the activity and duty cycle data for the internal nodes of the complex macro instance which internal nodes are the pins of the primitive macros contained in the complex macro instance. Once the activity and duty cycle data are obtained for the internal nodes, the power models for the primitive macros in the complex macro instance can be evaluated using the process of FIG. 4 described above.

Modifications and Alternate Embodiments

The above detailed descriptions are provided to illustrate specific embodiments of the present invention and are not intended to be limiting. Numerous modifications and variations within the scope of the present invention are possible. For instance, while the power analysis system has been described with respect to analyzing power consumption of an integrated circuit design, one of ordinary skill in the art would appreciate that the power analysis system of the present invention can be used in estimating power for a multitude of electrical designs, including PC-board level circuits.

Furthermore, the process sequences shown in the flow charts of FIGS. 2 to 4 are illustrative only. Of course, variations of the process steps are possible without departing from the spirit of the present invention. For example, in FIG. 2, the step of building a macro power model library can be performed in advance of preparing a RTL design model for power analysis. Then, a designer can use the same macro power model library to evaluate a number of RTL designs based on the same fabrication technology, for example.

Also, while in the above description, the power analysis system of the present invention performs power estimation of an integrated circuit design specified at the register-transfer level, one of ordinary skill in the art would appreciate that the power analysis system can be applied to perform power estimation of a design specified at the behavior level as well. In that case, the inferencing engine operates to transform the behavior level description of the design into a netlist of interconnected structural macro elements in an analogous manner as described above.

Lastly, while the process flow in FIG. 2 illustrates one iteration of the power analysis process, one of ordinary skill in the art would appreciate that the power analysis process described herein can be repeatedly applied in a design cycle to access the power dissipation level of a design as the design is being modified and optimized. The present invention is defined by the appended claims.

APPENDIX A

A power model for a 2-input NAND gate (ALF Format)

```
CELL NANDX {
        AREA = 192;
        PIN A1
        {
             DIRECTION = input;
             CAPACITANCE = 1.3468e-14;
        }
        PIN B1
        {
             DIRECTION = input;
             CAPACITANCE = 1.3744e-14
        }
        PIN Z1
        {
             DIRECTION = output;
        }
    FUNCTION {
        BEHAVIOR {
             Z1 = ! (A1&B1);
        }
    }
    VECTOR ( 01 A1 -> 10 Z1 && B1 ) {
        ENERGY {
             HEADER {
                 CAPACITANCE {
                     PIN = Z1 ;
                     TABLE {
                         0.000000e+00
                         3.000000e-14
                         5.000000e-14
                     }
                 }
                 SLEWRATE {
                     PIN = A1 ;
                     UNIT = 1s;
                     TABLE {
```

APPENDIX A-continued

A power model for a 2-input NAND gate (ALF Format)

```
                         1.020000e-10
                         3.000000e-10
                         4.020000e-10
                     }
                 }
             }
             TABLE {
                 8.235200e-14
                 8.363000e-14
                 8.232300e-14
                 1.138300e-13
                 1.027800e-13
                 9.951900e-14
                 1.353800e-13
                 1.183500e-13
                 1.129200e-13
             }
        }
    }
    VECTOR ( 10 B1 -> 01 Z1 && A1 ) {
        ENERGY {
             HEADER {
                 CAPACITANCE {
                     PIN = Z1 ;
                     TABLE {
                         0.000000e+00
                         3.000000e-14
                         5.000000e-14
                     }
                 }
                 SLEWRATE {
                     PIN = B1 ;
                     UNIT = 1s;
                     TABLE {
                         1.020000e-10
                         3.000000e-10
                         4.020000e-10
                     }
                 }
             }
             TABLE {
                 3.553500e-13
                 6.820900e-13
                 9.008600e-13
                 3.923400e-13
                 7.090000e-13
                 9.226000e-13
                 4.172500e-13
                 7.301430e-13
                 9.414330e-13
             }
        }
    }
    VECTOR ( 01 B1 -> 10 Z1 && A1 ) {
        ENERGY {
             HEADER {
                 CAPACITANCE {
                     PIN = Z1 ;
                     TABLE {
                         0.000000e+00
                         3.000000e-14
                         5.000000e-14
                     }
                 }
                 SLEWRATE {
                     PIN = B1 ;
                     UNIT = 1s;
                     TABLE {
                         1.020000e-10
                         3.000000e-10
                         4.020000e-10
                     }
                 }
             }
             TABLE {
                 7.968600e-14
                 8.248900e-14
```

APPENDIX A-continued

A power model for a 2-input NAND gate (ALF Format)

```
                    8.104900e-14
                    1.044300e-13
                    9.712200e-14
                    9.530400e-14
                    1.239000e-13
                    1.119700e-13
                    1.079000e-13
                }
            }
        }
        VECTOR ( 10 A1 -> 01 Z1 && B1 ) {
            ENERGY {
                HEADER {
                    CAPACITANCE {
                        PIN = Z1 ;
                        TABLE {
                            0.000000e+00
                            3.000000e-14
                            5.000000e-14
                        }
                    }
                    SLEWRATE {
                        PIN = A1 ;
                        UNIT = 1s;
                        TABLE {
                            1.020000e-10
                            3.000000e-10
                            4.020000e-10
                        }
                    }
                }
                TABLE {
                    1.837300e-13
                    5.155600e-13
                    7.356500e-13
                    2.254500e-13
                    5.416800e-13
                    7.558100e-13
                    2.504800e-13
                    5.625500e-13
                    7.742600e-13
                }
            }
        }
        VECTOR ( 10 B1 && !A1 ) {
            ENERGY {
                HEADER {
                    SLEWRATE {
                        PIN = B1 ;
                        UNIT = 1s;
                        TABLE {
                            1.020000e-10
                            3.000000e-10
                            4.020000e-10
                        }
                    }
                }
                TABLE {
                    5.958800e-14
                    6.050600e-14
                    6.029800e-14
                }
            }
        }
        VECTOR ( 01 A1 && ?B1 ) {
            ENERGY {
                HEADER {
                    SLEWRATE {
                        PIN = A1 ;
                        UNIT = 1s;
                        TABLE {
                            1.020000e-10
                            3.000000e-10
                            4.020000e-10
                        }
                    }
                }
```

APPENDIX A-continued

A power model for a 2-input NAND gate (ALF Format)

```
                TABLE {
                    5.139300e-14
                    4.591600e-14
                    4.506400e-14
                }
            }
        }
        VECTOR ( 10 A1 && !B1 ) {
            ENERGY {
                HEADER {
                    SLEWRATE {
                        PIN = A1 ;
                        UNIT = 1s;
                        TABLE {
                            1.020000e-10
                            3.000000e-10
                            4.020000e-10
                        }
                    }
                }
                TABLE {
                    7.567500e-14
                    7.459300e-14
                    7.445000e-14
                }
            }
        }
        VECTOR ( 01 B1 && !A1 ) {
            ENERGY {
                HEADER {
                    SLEWRATE {
                        PIN = B1 ;
                        UNIT = 1s;
                        TABLE {
                            1.020000e-10
                            3.000000e-10
                            4.020000e-10
                        }
                    }
                }
                TABLE {
                    -5.955200e-14
                    -5.989500e-14
                    -5.994500e-14
                }
            }
        }
    }
}
```

APPENDIX B

Tuple Definitions for the Primitive Macro Models
INVERTER (IN, OUT)

Function: OUT=!IN

Dynamic tuples:
  "UD", "DU"

Static tuples:
  "10", "01"

NAND (IN1, IN2, OUT)

Function: OUT=!(IN1&IN2);

Dynamic tuples:
  // arc-based model
  "1DU", "1UD", "D1U", "U1D", // these are re-mapped to "??U", "??D"
  "0U1", "0D1", "U01", "D01",
  // pin-based model
  "??U", "??D", "?U?", "?D?", "U??", "D??"

Static tuples:
  "001", "011", "101", "110"

XOR (IN1, IN2, OUT)

Function: Y=IN1^IN2
Dynamic tuples:
  // arc-based model
  "0UU", "0DD", "1UD", "1DU", "U0U", "D0D",
  "U1D", "D1U", // all remapped
  // pin-based model
  "U??", "D??", "?U?", "?D?", "??U", "??D"
Static tuples:
  "101", "011", "000", "110"

2-1 MULTIPLEXOR (IN1, IN2, SELECT, OUT)

Function: OUT=SELECT ? IN2:IN1
Dynamic tuples:
  // arc-based tuples: output changes
  "U00U", "U10U", "D00D", "D10D",
  "0U1U", "1U1U", "0D1D", "1D1D",
  "10UD", "01UU", "10DU", "01DD",
  // arc-based tuples: output does not change
  "0U00", "0D00", "1U01", "1D01",
  "U010", "D010", "U111", "D111",
  "00U0", "00D0", "11U1", "11D1",
  // pin-based tuples
  "U???", "D???", "?U??", "?D??",
  "??D?", "??D?", "???U", "???D"
Half-arcs:
  "U000", "100U", "U100", "110U", "D001", "000D",
    "D101", "010D".
  "0U10", "011U", "1U10", "111U", "0D11", "001D",
    "1D11", "101D",
  "10U1", "101D", "01U0", "011U", "10D0", "100U",
    "01D1", "010D"
Static tuples:
  "0000", "0100", "1001", "1101",
  "0010", "1010", "0111", "1111"

TRI-STATE DRIVER (ENABLE, IN, OUT)

Function: OUT=ENABLE?IN:Z
Dynamic tuples:
  // arc-based tuples
  "1UU", "1DD", "U0D", "U1U",
  "0UZ", "0DZ",
  "D0?", "D1?", // for tri-state, ? effectively represents
    00, 11, 0z, 1z
  // pin-based tuples
  "U??", "D??", "?U?", "?D?", "??U", "??D"
Half-arcs:
  // half-arcs
  "1?U", "1?D", // these are remapped to "U1U", "U0D"
Static tuples:
  "00Z", "01Z", "100", "111"

FULL ADDER (IN1, IN2, IN3, OUT1, OUT2)

Function:
  OUT1=IN1^IN2^IN3
  OUT2=
Dynamic Tuples:
  // arc-based tuples

"D01UD", "D10UD", "0D1UD", "1D0UD",
  "01DUD", "10DUD",
"U01DU", "U10DU", "0U1DU", "1U0DU",
  "01UDU", "10UDU",
"U11U1", "D11D1", "1U1U1", "1D1D1", "11UU1",
  "11DD1",
"U00U0", "D00D0", "0U0U0", "0D0D0", "00UU0",
  "00DD0",
// pin-based tuples
"U????", "D????", "?U???", "?D???", "??U??",
  "??D??",
"???U?", "???D?", "????U", "????D"
Half-arcs:
  "D0101", "001UD", "D1001", "010UD", "0D101",
    "001UD",
  "1D001", "100UD", "01D01", "010UD", "10D01",
    "100UD",
  "U0110", "101DU", "U1010", "110DU", "0U110",
    "011DU",
  "1U010", "110DU", "01U10", "011DU", "10U10",
    "101DU",
  "U1101", "111U1", "D1111", "011D1", "1U101",
    "111U1",
  "1D111", "101D1", "11U01", "111U1", "11D11",
    "110D1",
  "U0000", "100U0", "D0010", "000D0", "0U000",
    "010U0",
  "0D010", "000D0", "00U00", "001U0", "00D10",
    "000D0"
Static tuples:
  "10010", "01010", "00110", "11001", "10101",
  "01101", "11111", "00000"

TRANSPARENT LATCH (IN, ENABLE, CLEAR, SET, OUT1, OUT2)

Function:
  if (CLEAR)
    OUT1=0; OUT2=1
  Else if (SET)
    OUT1=1; OUT2=0
  else if (ENABLE)
    OUT1=IN; OUT2=!IN
  Else
    OUT1=OUT1; OUT2=OUT2
Dynamic tuples:
  // Arc-based tuples
  "1U00UD", "0U00DU", "U100UD", "D100DU",
  "??D0DU", "??0UUD",
  "0U0001", "1U0010", "0D0001", "1D0010",
  "U?1001", "D?1001", "?U1001", "?D1001",
  "U?0110", "D?0110", "?U0110", "?D0110",
  "U000??", "D000??",
  // Pin-based tuples
  "U?????", "D?????", "?U????", "?D????",
  "????U?", "????D?", "?????U", "?????D",
  "??U???", "???U??", "??D???", "???D??",
Half-arcs:
  "1U0001", "1100UD", "0U0010", "0100DU",
  "U10001", "1100UD", "D10010", "0100DU",
  "D10010", "0100DU", "??0U01", "??01UD"
Static tuples:
  "000110", "010110", "100110", "110110",
  "001001", "011001", "101001", "111001",
  "000001", "000010", "100001", "100010",
  "010001", "110010"

FLIP-FLOP (IN, CLOCK, CLEAR, ENABLE, SET, OUT1, OUT2)

Function:
Dynamic tuples:
  //Arc-based tuples—output changes
  "0U010DU", "1U010UD", "??U10DU", "??01UUD",
  // output does not change
  "U111???", "U101???", "U011???", "U001???",
  "D111???", "D101???", "D011???", "D001???",
  "1D01?10", "0D01?01", "0U01001", "1U01010",
  "1U11?01", "0U11?01", "1D11?01", "0D11?01",
  "U??0???", "D??0???", "?U000??", "?D000??",
  "??U1001", "??D1?01", "??01U10", "???1D10",
  // Pin-based model
  "U??????", "D??????", "?U?????", "?D?????",
  "?????U?", "?????D?", "??????U", "??????D",
  "??U????", "????U??", "??D????", "????D??"
Half-arcs:
  "0U01010", "01010DU", "1U01001", "11010UD",
  "??U1010", "??110DU", "??01U01", "??011UD",
Static tuples:
  "0000110", "0100110", "1000110", "1100110",
  "0001110", "0101110", "1001110", "1101110",
  "0010001", "0110001", "1010001", "1110001",
  "0011001", "0111001", "1011001", "1111001",
  "0010101", "0110101", "1010101", "1110101",
  "0010110", "0110110", "1010110", "1110110",
  "0011101", "0111101", "1011101", "1111101",
  "0011110", "0111110", "1011110", "1111110",
  "0000001", "0100001", "1000001", "1100001",
  "0000010", "0010010", "0100010", "0110010",
  "1000010", "1010010", "1100010", "1110010",
  "0000101", "1000101", "0100101", "1100101",
  "0001001", "0001010", "1001010", "1001001",
  "0101001", "0101010", "1101010", "1101001"

APPENDIX C

Specific Optimizations for Calculating the Weight of Tuples of an ADDER, 2-1 MUX, FLIP-FLOP, and LATCH Primitive Macros

ADDER:

For the twenty four full-arc tuples presented in Appendix A, the following logic is used:
  The tuple expected count is estimated based on outputs only.
  All arc-based adder tuples are split into four groups, each having 6 tuples:
    1. Both S and CO change, S goes U
    2. Both S and CO change, S goes D
    3. Only S changes, CO is 1
    4. Only S changes, CO is 0
  Tuples in each group are assigned equal expected count (1/6 th)
  Note: this method is tailed to the tuple set explicitly defining each transaction, no don't care "?" is allowed.
  For all other tuples, the generic approach is used.

FLIP-FLOP:

"??U10DU":
  // Estimate as ½ reset activity_while
  // Q is high_
"??U1001":
  // Estimate as ½ reset activity while
  // Q is low
"??01U10":
  // Estimate as ½ set activity while
  // Q is high
"??01UUD":
  // Estimate as ½ set activity while
  // Q is low;
  product=0.5*activity array[ ]
"0U010DU":
  // Estimate as ½ Q activity—½ reset activity*duty(Q)
  // as adjustment for tuple "??U10DU"
  product=clockActivity>0.0?0.5*(activityArray[ ]
"1U010UD":
  // Estimate as ½ Q activity—½ set activity*(1-duty(Q))
  // as adjustment for tuple "??01UUD"
"??????U" or "??????D":
{
  // Estimate as ½ of activity of Q
  Else use the generic approach

LATCH:

"1U00UD":
{
  // Estimate as
  // (½ Q activity—½ set activity*
  // (1-duty(Q)))*(1-duty(EN))
"U100UD":
  // Estimate as
  // (½ Q activity—½ set activity*(
  // 1-duty(Q)))*duty(EN)
"??0UUD":
  // Estimate as ½ set activity while
  // Q is low
"??0U10":
  // Estimate as ½ set activity while
  // Q is high
"0U00DU":
  // Estimate as
  // (½ Q activity—½ reset activity*
  // duty(Q))*(1-duty(EN))
"D100DU":
  // Estimate as
  // (½ Q activity—½ reset activity*
  // duty(Q))*duty(EN)
"??U0DU":
  // Estimate as ½ reset activity_while
  // Q is high_
"??U001":
  // Estimate as ½ reset activity
  // while Q is low
"?????U" or "?????D":
  // Estimate as ½ of activity of Q
  Else use the generic approach 2-1 MUX:

// The following applies only for cases when the
  // select does not change, if it does, generic
  // calculation below works just fine

```
// Estimate as the
// output activity adjusted by taking out the
//contribution of the toggles caused by
// select changes (when inputs are
// different)
// Dadj(Z)=D(Z)-D(SEL)*(P(A)(1-P(B))+
// P(B)(1-P(A)))
// D( ) is activity or a pin, P( ) is a duty
// cycle of a pin.
```

APPENDIX D

A general function for calculating
the weight of a tuple

```
double DefaultCellPowerModel::expectedOccurrence (const char*
                                                  tuple, double*
                                                  dutyArray,
                                                  double*
                                                  activityArray)
{
    int index = 0;
    double product = 0.0;
    SFLPinClassType pinclass;
    RWBoolean productSet = FALSE;
    char outEdge;
    // Need to count output activity for non-arc-based tuples
    RWBoolean countOutputActivity = (isTupleArcBased(tuple)) ?
    FALSE : TRUE;
    // Note: for MUX and XOR, other adjustments are made to take
    // into account output activity. For NAND and TRI, vector
    // remapping is done.
    for (index = 0; index < numberPins( ); index++)
    {
        //The logic of code piece expression lies in the meaning of
        // ? (don't care) symbol. While ? does not alter the
        // probability of a tuple, it can't create a match for a
        // tuple by itself. In other words, the expected
        // occurrence of a tuple ???? is 0, and that of D??? is half
        // the activity on the first pin.
        if (!productSet && tuple[index] != '?')
        {
            product = 1.0;
            productSet = TRUE;
        }
        // If none of the conditions above matched, continue with
        // generic approach.
        pinclass = (pinClasses()) [index];
        // don't count outputs of combinational cells or
        // more than one output of sequential cells.
        if ( ! countOutputActivity && SFL_PINCLASS_OUT ==
        pinclass ) continue;
        switch (tuple [index])
        {
            //
            //
            //
            //
            //
            case '0' :
                if (SFL_PINCLASS_OUT ! = pinclass)
                    product *= (sflPinActiveLow(index)) ?
                    dutyArray [index]:
                        1.0 - dutyArray[index];
                break;
            case '1' :
                if (SFL_PINCLASS_OUT != pinclass)
                    product *= (sflPinActiveLow(index)) ? 1.0 -
                    dutyArray[index] :
                        dutyArray[index];
                break;
            case 'U' :
            case 'D' :
                // don't count input edges if there are output edges
                // in the tuple. However, if the pin does not toggle,
                // we need to nil the 'product' as this tuple will not
                // be occurring - skip the "output toggles only"
cheek.
                if (activityArray[index] > 0 &&
```

APPENDIX D-continued

A general function for calculating
the weight of a tuple

```
                SFL_PINCLASS_OUT != pinclass)
                {
                    outEdge =
                    tuple[tupleIndexForPinclass
                    (SFL_PINCLASS_OUT, 1)];
                    if ( countOutputActivity && ('U' == outEdge || 'D'
                    == outEdge) )
                    continue; // next pin, please
                }
                // It is necessary to divide by 2 as the activity
                // number represents total activity, which is the sum
                // of rising and falling edges. This will go away when
                // rising and falling transitions will have a separate
                // count
                product *= activityArray[index] /2.0;
                break;
            default :
                break;
        } // switch
    } // for (index)
    return product;
}
```

I claim:

1. A system for analyzing the power consumption of an electrical design, said system comprising:
a structural element library including a set of technology-independent structural macro elements;
a macro power model module providing macro power models for one or more of said structural macro elements in said structural element library, each of said macro power models being associated with a power model in a user-specified gate-level power model library; and
a power estimation module providing a power consumption value of said electrical design by(a) mapping said electrical design into a netlist of interconnected components based on instances of said technology-independent structural macro elements, and (b) computing said power consumption value being based on activity and duty cycle data associated with macro power models associated with said instances of said structural macro elements in said netlist.

2. The system of claim 1, wherein said electrical design is specified by a behavior level description, and said mapping is provided by an inference module providing said netlist based on said behavior level description and said structural macro elements.

3. The system of claim 2, wherein said electrical design is specified at the register-transfer level.

4. The system of claim 2, wherein said netlist is provided at a micro-architectural level.

5. The system of claim 1, wherein said electrical design is received into said system in the form of a netlist based on a cell library other than said structural element library.

6. The system of claim 1, wherein said macro power model module includes a set of vector representations for said said structural macro elements, each of said sets of vector representations defining valid transitions of a corresponding structural macro element.

7. The system of claim 1, wherein said structural macro elements include at least one primitive macro and at least one complex macro, said complex macro comprising one or more instances of said primitive macro, said macro power model module constructs said macro power models only for said primitive macro.

8. The system of claim 6, wherein each of said sets of vector representations defines all valid transitions for said corresponding structural macro element.

9. The system of claim 6, wherein each of said sets of vector representations is constructed based on the function of said corresponding structural macro element.

10. The system of claim 9, wherein each vector representation includes a string of symbols, each of said symbols representing a pin of said corresponding structural macro element.

11. The system of claim 10, wherein said symbol is selected from a group comprising: "0" representing a static Boolean low value, "1" representing a static Boolean high value, "2" representing a static tri-state condition, "?" representing a static don't care value, "U" representing a rising transition, and representing a falling transition.

12. The system of claim 9, wherein said macro power model module associates each of said one or more of said structural macro elements with a logic cell for which a power model is defined in said user-specified gate-level power model library, said logic cell having the same logic function as said corresponding structural macro element.

13. The system of claim 12, wherein said macro power model module maps a first power arc description in a first power model in said gate-level power model library for a first logic cell to a first vector representation in said set of vector representations for a first one of said structural macro elements, said first logic cell being associated with said first one of said structural macro elements.

14. The system of claim 13, wherein said power estimation module computes a weight for said first vector representation mapped to said first power arc description using said activity and duty cycle data for an instance of said first one of said structural macro elements in said netlist.

15. The system of claim 14, wherein said power estimation module computes said power consumption value for said instance of said first one of said structural macro elements by applying said weight of said first vector representation to said macro power model associated with said first one of said structural macro elements.

16. The system of claim 14, wherein each of said vector representations includes a string of symbols, each of said symbols representing a pin of said corresponding structural macro element; and said power estimation module computes said weight for said first vector representation by selecting a group of statistically independent pins of said first vector representation, said weight being proportional to a product of the probabilities for each of said group of statistically independent pins of said first vector representation to be in a state defined by said vector representation.

17. The system of claim 14, wherein said activity and duty cycle are derived from simulation data of said electrical design.

18. The system of claim 17, wherein said simulation data is obtained by simulating said electrical design specified at the behavior level.

19. The system of claim 17, wherein said simulation data is specified by a designer of said electrical design.

20. The system of claim 17, wherein said simulation data is calculated from pre-existing simulation data using probabilistic activity propagation techniques.

21. The system of claim 1, wherein said set of structural macro elements includes primitive macros comprising at least one of the following elements: inverter, NAND, XOR, 2-1 Multiplexor, Latch, Flip-Flop, Adder, and Tri-State Driver.

22. The system of claim 1, wherein said set of structural macro elements includes complex macros comprising at least one of the following elements: Decoder, Comparator, Multiplier, Unencoded Multiplexor, Register_File and Latch_File.

23. The system of claim 1, wherein said user-specified gate-level power model library includes arc-based power model descriptions, or pin-based power model descriptions, or a combination of arc-based and pin-based power model descriptions.

24. The system of claim 1, wherein said user-specified gate-level power model library includes arc-based power model descriptions written in one or more formats.

25. The system of claim 24, wherein said formats include one or more of the following library formats: Advanced Library Format (ALF), Open Library API (OLA) and .lib format.

26. A method for analyzing the power consumption of an electrical design, said method comprising:

organizing a structural element library including a set of technology-independent structural macro elements;

providing a netlist of interconnected components representative of said electrical design using instances of structural macro elements in said structural element library;

constructing macro power models for said structural macro elements, each of said macro power models being associated with a power model in a user-specified gate-level power model library; and calculating a power consumption value for said electrical design using activity and duty cycle data associated with macro power models of each of said instances of structural macro elements.

27. The method of claim 26, wherein said electrical design is specified by a behavior level description.

28. The method of claim 27, wherein said electrical design is specified at the register-transfer level.

29. The method of claim 27, wherein said netlist is provided at a micro-architectural level.

30. The method of claim 26, wherein said electrical design is specified by a second netlist based on a cell library other than said structural element library.

31. The method of claim 26, further comprises calculating said power consumption value for said electrical design by summing power consumption values for each of said instances of said structural macro elements.

32. The method of claim 26, wherein said constructing macro power models for one or more of said structural macro elements comprises:

defining a set of vector representations for each of said one or more of said structural macro elements, said set of vector representations defining valid transitions of said corresponding structural macro element.

33. The method of claim 26, wherein said structural macro elements include a group of primitive macros and a group of complex macros comprising one or more instances of said primitive macros; and wherein constructing macro power models for one or more of said structural macro elements comprises:

constructing macro power models for said group of primitive macros only.

34. The method of claim 33, wherein when said first one of said structural macro elements is a complex macro, said calculating a power consumption value for a component of said netlist comprises:

decomposing said first one of said structural macro elements into instances of said primitive macros; and calculating said power consumption value for each of said instances of said primitive macros.

35. The method of claim 32, wherein said defining a set of vector representations for each of said one or more of said structural macro elements comprises:

defining said set of vector representations for all valid transitions of said corresponding structural macro element.

36. The method of claim 32, wherein said defining a set of vector representations for each of said one or more of said structural macro elements comprises defining said set of vector representations based on the function of said corresponding structural macro element.

37. The method of claim 36, wherein said defining a set of vector representations for each of said one or more of said structural macro elements further comprises:

defining each vector representation as a string of symbols, each of said symbols representing a pin of said corresponding structural macro element.

38. The method of claim 36, wherein said constructing macro power models for one or more of said structural macro elements comprises:

associating each of said one or more of said structural macro elements with a logic cell for which a power model is defined in said user-specified gate-level power model library, said logic cell having the same logic function as said corresponding structural macro element.

39. The method of claim 38, wherein said constructing macro power models for one or more of said structural macro elements further comprises:

mapping a first power arc description in a first power model in said gate-level power model library for a first logic cell to a first vector representation in said set of vector representations for said first one of said structural macro elements, said first logic cell being associated with said first one of said structural macro elements.

40. The method of claim 39, wherein said calculating a power consumption value for said electrical design comprises, for each of said instances of structural macro elements:

selecting from said first vector representation a group of statistically independent pins of said structural macro element;

computing a weight for said first vector representation mapped to said first power arc description based on said group of statistically independent pins;

wherein said weight is computed using activity and duty cycle data for said instance of structural macro element.

41. The method of claim 40, wherein said calculating a power consumption value for said electrical design further comprises:

calculating a power contribution value of said instance of structural macro element by applying said weight of said first vector representation to said macro power model associated with said structural macro element.

42. The method of claim 40, wherein said weight is proportional to a product of the probabilities for of each of said group of statistically independent pins of said first vector representation to be in a state defined by said vector representation.

43. The method of claim 40, wherein said activity and duty cycle data are derived from simulation data of electrical design.

44. The method of claim 43, wherein said simulation data is obtained by simulating said electrical design specified at the behavior level.

45. The method of claim 43, wherein said simulation data is specified by a designer of said electrical design.

46. The method of claim 43, wherein said simulation data is calculated from pre-existing simulation data using probabilistic activity propagation techniques.

47. The system of claim 26, wherein said user-specified gate-level power model library includes arc-based power model descriptions, or pin-based power model descriptions, or a combination of arc-based and pin-based power model descriptions.

48. The method of claim 26, wherein said user-specified gate-level power model library includes arc-based power model descriptions written in one or more formats.

49. The method of claim 48, wherein said formats include one or more of the following library formats: Advanced Library Format (ALF), Open Library API (OLA) and .lib format.

50. The method of claim 26, wherein said instances of said structural macro element include an instance of a structural macro element having a bitwidth of m and which comprises a base element having a bitwidth of n, m being greater than n, said calculating a power consumption value for said electrical design comprises:

determining a first count indicative of the number of base element required to constitute said component;

calculating a power consumption value of said base element using simulation data for said component; and adjusting said power consumption value based on said first count.

* * * * *